United States Patent

[11] 3,628,618

| [72] | Inventor | Thomas P. Cash |
| --- | --- | --- |
| | | 158 Glenmar Road, Mesa, Ariz. |
| [21] | Appl. No. | 882,008 |
| [22] | Filed | Dec. 4, 1969 |
| [45] | Patented | Dec. 21, 1971 |

[54] FLAP WHEEL
4 Claims, 3 Drawing Figs.

[52] U.S. Cl. .................................................. 180/7, 180/6, 115/1, 305/1
[51] Int. Cl. .................................................... B62d 57/00
[50] Field of Search ........................................... 180/7, 6; 115/1, 23, 49; 305/1

[56] References Cited
UNITED STATES PATENTS

| 3,227,125 | 1/1966 | Grebe .......................... | 115/1 |
| --- | --- | --- | --- |
| 3,231,293 | 1/1966 | Loustaunau .................. | 280/158 X |

FOREIGN PATENTS

| 18,125 | 11/1913 | Denmark ...................... | 180/6 |
| --- | --- | --- | --- |
| 565,736 | 11/1944 | Great Britain ................ | 180/7 |

*Primary Examiner*—Leo Friaglia
*Attorney*—Willard L. Groene

ABSTRACT: A flap wheel comprising a series of flexible radially extending ground contacting flaps fixed to a central hub to provide low turning resistance and has a small lower radius to ground and a larger upper free radius so that its load-bearing surface is larger and changes shape in different situations and is capable of doing useful work with the forward half of its upper radius as well as its lower half.

PATENTED DEC 21 1971

3,628,618

INVENTOR.
THOMAS P. CASH
BY
Willard S. Grow
ATTORNEY

FLAP WHEEL

BACKGROUND OF THE INVENTION

In comparison with former rigid wheels or track-laying vehicles, this invention is a hybrid-cross. It brings out the good points of each, disposes of the poor points of each, and has some unique features of its own. This invention pertains to a wheel having a journaled or driven hub with flexible radially disposed flaps fixed to and extending radially outwardly from the hub so as to overcome the failings of high friction loss of former track laying vehicles and lack of load-carrying capacity and traction of wheeled vehicles.

SUMMARY OF THE INVENTION

One of the objects of this invention is to provide a flap wheel that resembles a wheel with a central hub revolving on or driven by an axle and has a low turning resistance with the ground surface yet has a small lower radius and a larger upper radius for its periphery.

Another object is to provide a flap wheel with a load bearing surface that is larger and changes shape in different situations of operation and ground surfaces.

Still another object is to provide a flap wheel that is capable of doing useful work with the forward half of its upper radius as well as with its lower bottom half.

It is also an object to provide a flap wheel that resembles a track with its low profile and long load-bearing surface.

Also an object is to provide a flap wheel forming an endless oval track, cut up into short sections and mounted at one end to a rotating shaft so that as the shaft rotates a section of track is laid down on the ground and the shaft moves along over this track and before the shaft reaches the end of the track another section has been laid down to travel upon and a continued forward motion is attained.

Further, an object is to allow the flaps to not only spread out the loading of the flap wheel but to also act as a suspension system to provide a smooth and even ride for the vehicle.

It is also an object to provide a flap wheel that operates equally well in either direction of rotation.

Another object is to provide the flap wheel with flexible radially disposed flaps that spread the load over a greater area than a conventional wheel due to the resiliency of the specially arranged flaps, to allow the flaps to bend around obstacles and irregularities to let the machine freely pass and continue on its way.

Another object is to provide a flap wheel in which the arrangement of the flexible flaps makes it virtually impossible for any foreign material to lodge on the wheel and interfere with its functioning.

DESCRIPTION OF THE PREFERRED EMBODIMENT

As an example of one embodiment of this invention, there is shown a flap wheel having a hub 10 with journal ends 11 suitably rotatably mounted on support suspension frame members 12 of a vehicle or the hub may be rigidly fixed to a suitable driving axle as when used on a motor vehicle.

A series of circumferentially spaced radially disposed load supporting and traction flaps are rigidly fixed at their inner edges to the periphery of the hub, the outer edges of the flaps being free and to overlap adjacent flaps as the flaps bend over during the operation of the vehicle over the land surface.

Figure 1:
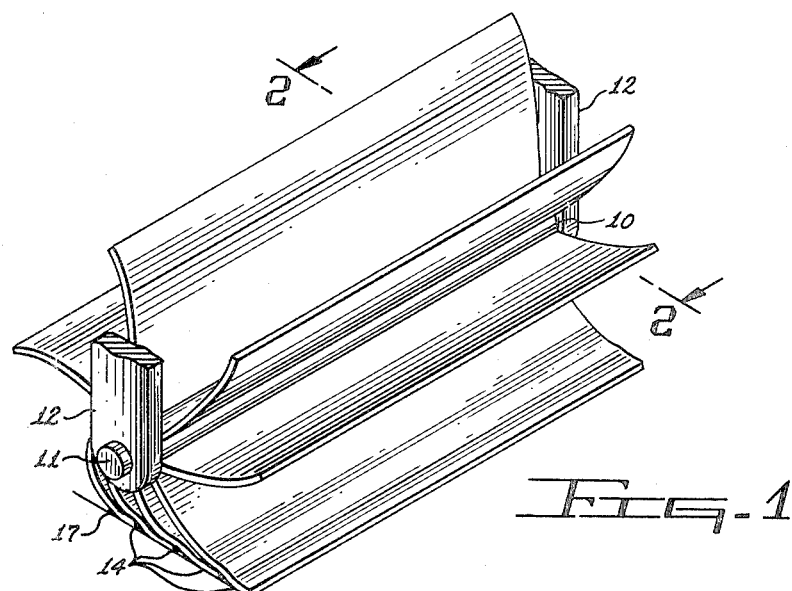
FIG. 1 is a perspective view of a flap wheel incorporating the feature of this invention.
Figure 2:
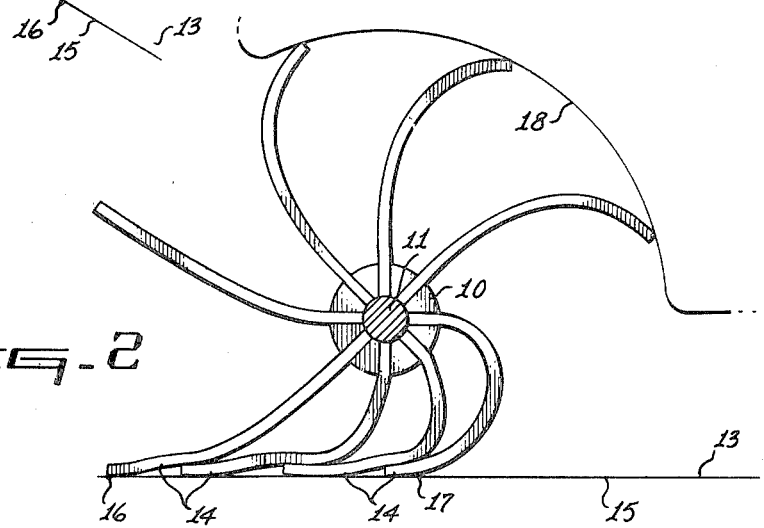
FIG. 2 is an enlarged cross-sectional view of the flap wheel on the line 2—2 of FIG. 1.

In FIGS. 1 and 2 is shown the flap wheel engaging the ground surface 13 and irrespective of its direction of travel the overlapping flaps at 14 form an extended load-supporting platform as indicated by the line 15, between points 16 and 17.

In FIG. 2, the upper flaps may engage an arcuate surface 18 of the vehicle frame to reduce their overall height above ground, initially bending the flaps as they leave the ground surface, and to help dislodge foreign material between the flaps.

Figure 3:
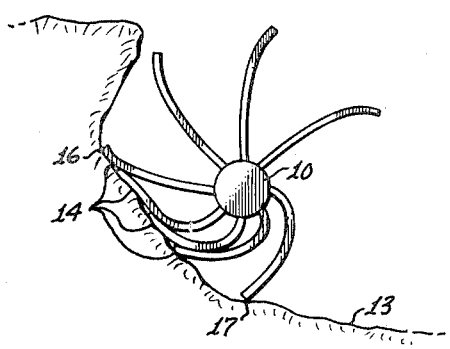
FIG. 3 is an end view of the flap wheel approaching and engaging a high snow embankment.

In FIG. 3, the flap wheel is approaching, cutting down and compacting and preparing to climb up over a snow bank equal in height to its diameter so that the flap wheel will take snow in heights in excess of its lower and upper radius and pull it down and under to build a track for rear subsequent flap wheels to run on. A conventional wheel can only do this with its lower radius, thereby requiring an overall size twice the size of the flap wheel to accomplish the same job.

I claim:

1. A flap wheel vehicle comprising:
   A. a frame, and extending substantially the width of the vehicle,
   B. a hub journaled on the frame,
   C. a series of circumferentially spaced radially disposed flexible flaps fixed at their inner edges to the periphery of the hub,
   D. the outer edges of the flaps being freely movable in response to contact with the supporting surface,
   E. said flaps each having a width extending along said hub greater than the length of the flap extending outwardly from said hub.

2. A flap wheel vehicle as in claim 1 wherein an arcuate surface on the frame engages the outer edges of the flaps to bend and deflect the flaps at the upper portion of the wheel.

3. A flap wheel vehicle as in claim 1 wherein the outer portions of a plurality of flaps overlap to form a load supporting area of contact with said surface for better suspending the vehicle.

4. A flap wheel vehicle as set forth in claim 1 in further combination with means mounted on said frame for engaging the flaps after they leave said surface to bend and deflect the flaps to reduce their overall height above said surface.

* * * * *